United States Patent
Iwasa et al.

(10) Patent No.: US 7,439,007 B2
(45) Date of Patent: *Oct. 21, 2008

(54) PHASE CHANGE INFORMATION RECORDING MEDIUM HAVING MULTIPLE LAYERS AND RECORDING AND PLAYBACK METHOD FOR THE MEDIUM

(75) Inventors: Hiroyuki Iwasa, Yokohama (JP); Michiaki Shinotsuka, Hiratsuka (JP); Masaru Shinkai, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 526 days.

This patent is subject to a terminal disclaimer.

(21) Appl. No.: 10/738,012

(22) Filed: Dec. 16, 2003

(65) Prior Publication Data

US 2004/0130998 A1     Jul. 8, 2004

(30) Foreign Application Priority Data

Dec. 20, 2002  (JP)  ............................. 2002-370834
May 20, 2003  (JP)  ............................. 2003-142669

(51) Int. Cl.
   *G11B 7/24* (2006.01)
(52) U.S. Cl. .................. 430/270.13; 430/945; 428/64.4; 428/64.5; 369/288; 369/284
(58) Field of Classification Search .................. None
   See application file for complete search history.

(56) References Cited

U.S. PATENT DOCUMENTS

| | | |
|---|---|---|
| 5,251,202 A | 10/1993 | Kaneko et al. |
| 5,298,305 A | 3/1994 | Shinozuka et al. |
| 5,736,657 A | 4/1998 | Ide et al. |
| 6,018,510 A | 1/2000 | Abe et al. |
| 6,096,398 A | 8/2000 | Yuzurihara et al. |
| 6,221,557 B1 | 4/2001 | Harigaya et al. |
| 6,426,936 B1 | 7/2002 | Shinotsuka et al. |

(Continued)

FOREIGN PATENT DOCUMENTS

EP        245833     * 11/1987

(Continued)

OTHER PUBLICATIONS

N. Yamada et al., "Phase Change Material for Use in Rewritable Duel-Layer Optical Disk Utilizing a Blue-Violet Laser," Opt. Data Stor. Topical Meeting, Apr. 2001, pp. 22-24.

(Continued)

*Primary Examiner*—Martin J Angebranndt
(74) *Attorney, Agent, or Firm*—Cooper & Dunham LLP

(57) ABSTRACT

A multilayer phase change information recording medium including plural information layers containing at least a first information layer and a last information layer, each of which includes a recording layer in which information is recorded utilizing a phase change between a crystalline phase and an amorphous phase. At least one of the plural information layers other than the last information layer includes a first lower protective layer, a first recording layer located overlying the lower protective layer, a first upper protective layer located overlying the first recording layer, a first reflective layer located overlying the first upper protective layer, and a heat diffusion layer located overlying the first reflective layer and which mainly contains In, Zn and O.

19 Claims, 4 Drawing Sheets

U.S. PATENT DOCUMENTS

| | | |
|---|---|---|
| 6,652,948 B2 | 11/2003 | Shinotsuka et al. |
| 6,670,014 B2 * | 12/2003 | Nishihara et al. .......... 428/64.1 |
| 7,012,878 B2 | 3/2006 | Shinotsuka et al. |
| 2003/0035360 A1 | 2/2003 | Shinotsuka et al. |
| 2003/0081537 A1 | 5/2003 | Shinotsuka |
| 2004/0001424 A1* | 1/2004 | Togashi et al. ............... 369/283 |
| 2004/0037203 A1 | 2/2004 | Harigaya et al. |
| 2004/0076908 A1* | 4/2004 | Oomachi et al. ....... 430/270.13 |
| 2004/0105182 A1* | 6/2004 | Nishihara et al. ........... 359/883 |
| 2004/0121261 A1* | 6/2004 | Ashida et al. .......... 430/270.13 |
| 2005/0270959 A1* | 12/2005 | Iwasa et al. ................. 369/116 |
| 2006/0171290 A1* | 8/2006 | Shinotsuka et al. ...... 369/275.1 |
| 2006/0228531 A1* | 10/2006 | Iwasa et al. ............... 428/195.1 |
| 2006/0233095 A1* | 10/2006 | Iwasa et al. ................. 369/288 |
| 2007/0237064 A1* | 10/2007 | Fujii et al. .................. 369/286 |
| 2007/0283378 A1* | 12/2007 | Iwasa et al. ................. 720/718 |

FOREIGN PATENT DOCUMENTS

| | | | |
|---|---|---|---|
| EP | 677593 | * | 10/1995 |
| EP | 1347448 | * | 9/2003 |
| JP | 08050739 | | 2/1996 |
| JP | 02702905 B2 | | 1/1998 |
| JP | 11-186584 | * | 7/1999 |
| JP | 2000-195101 | * | 7/2000 |
| JP | 2000215516 | | 8/2000 |
| JP | 2000222777 | | 8/2000 |
| JP | 2001243655 | | 9/2001 |
| JP | 2001-316805 | * | 11/2001 |
| JP | 2002-133718 | * | 5/2002 |
| JP | 2002-251792 | * | 9/2002 |
| JP | 2002-298433 | * | 10/2002 |
| JP | 2003-303443 | * | 10/2003 |

OTHER PUBLICATIONS

K. Narumi et al., "45 GB Rewritable Dual-Layer Phase-Change Optica Disk with a Transmittance Balanced Structure," ISOM 2001 Technical Digest, p. 202.

* cited by examiner

⇧ LASER BEAM

⇧ LASER BEAM

PHASE CHANGE INFORMATION RECORDING MEDIUM HAVING MULTIPLE LAYERS AND RECORDING AND PLAYBACK METHOD FOR THE MEDIUM

BACKGROUND OF THE INVENTION

1. Field of the Invention

The present invention relates to a multilayer phase change information recording medium for use in recording and playing back information with light such as a laser beam and to a recording and playback method for the medium.

2. Discussion of the Background

Generally, phase change optical discs (phase change information recording media) such as CD-RWs contain a plastic substrate, a recording layer and a reflective layer. The recording layer is made of a phase change material and is formed on the plastic substrate. The reflective layer is formed on the recording layer in order to improve optical absorptivity of the recording layer. The reflective layer also has a heat diffusion effect. Information is recorded and played back with a laser beam.

When a laser beam irradiates a phase change material, the phase change material phase-changes between a crystalline state and an amorphous state. An amorphous state is achieved upon rapid heating followed by rapid cooling and a crystalline state is achieved upon rapid heating followed by gradual cooling. Phase change information recording media utilizes this characteristic to record and play back information.

Further, in order to prevent oxidation, evaporation and transformation of the recording layer due to the heat of a laser beam, a lower protective layer (also referred to as lower dielectric layer) and an upper protective layer (also referred to as upper dielectric layer) are provided between the substrate and the recording layer and between the recording layer and the reflective layer, respectively.

Furthermore, the optical characteristics of a recording medium can be adjusted by the thickness of the protective layers. In addition, the lower protective layer has also a function of preventing the substrate from softening due to the heat generated at recording.

Recently, the amount of information dealt with by computers has been increasing. Therefore the signal recording capacity of optical discs such as DVD-RAMs and DVD+RWs and the density of the signal information has increased.

Currently, the recording capacities of CDs and DVDs are about 650 MB and about 4.7 GB, respectively. From now on, an increasing demand will be expected for high recording capacity and high density.

In attempting to prepare a medium having a high recording capacity and density using such phase change information recording media, there is a proposal in which the wavelength of a laser beam used is made to be shifted to a blue ray region. There is another proposal in which the spot size of a laser beam irradiating an optical medium is made to be small by using a high NA objective lens for a pickup for recording and playback.

In attempting to obtain a high recording capacity by improving information recording media itself, for example, Japanese Patent No. 2702905 and published unexamined Japanese Patent Application Nos. 2000-215516, 2000-222777 and 2001-243566 have disclosed double layer phase change information recording media wherein two information layers, each of which contains at least a recording layer and a reflective layer, are overlaid on one side of a substrate. The two information layers are bonded to each other with an ultraviolet curing resin or the like.

This bonding portion between the information layers is a separation layer (referred to as an intermediate layer in the present invention). This separation layer has a function of optically separating the two information layers and is made of materials which absorb light as little as possible in order that the laser beam for use in recording and playback reaches the inner information layer as much as possible.

The first information layer which includes a first protective layer and a second protective layer is characteristic to all of these double layer phase change information recording media as in the case of a single layer phase change information recording medium.

This type of double layer phase change information recording media was announced in, for example, academic conference (e.g., ODS2001 Technical Digest P22-24 (P24 FIG. 5)) but there are still many issues to be solved.

A laser beam should sufficiently transmit through the first information layer which receives the laser beam first in order to record and play back information in the recording layer of the second information layer. Thinkable measures to this issue are that the reflective layer included in the first information layer is removed or made to be extremely thin, or the recording layer included in the first information layer is made to be extremely thin.

Information is recorded in a phase change information recording medium by marks formed when a crystalline state of the recording layer is phase changed to an amorphous state upon application of a laser beam to the phase change material and subsequent rapid cooling.

Therefore, when no reflective layer or an extremely thin layer, for example, with a thickness of approximately 10 nm, is provided, the heat diffusion effect decreases, resulting in difficulty in forming amorphous marks.

Especially, an Sb—Te eutectic crystal recording material, which is one of the typical materials for use in phase change information recording media such as CD-RWs, is excellent in erase ratio compared with a Ge—Sb—Te compound containing recording material. In addition, such an Sb—Te eutectic crystal recording material is so sensitive that an amorphous recording mark can have a clear contour.

However, an Sb—Te eutectic crystal recording material has relatively fast crystallization speed compared to a Ge—Sb—Te compound containing recording material. Therefore, rapid cooling needs to be performed in a short time to achieve an amorphous state and a structure suitable for such rapid cooling is required. Therefore, forming marks becomes difficult using this material when a reflective layer is extremely thin.

In attempting to clear the problem mentioned above that occurs in the first information layer having a thin reflective layer, Japanese Patent Application Nos. 8-50739 and 2000-222777 have disclosed a single layer phase change information medium and a double layer phase change information medium, respectively. The method of the media is that a heat diffusion layer consisting of compounds having a relatively high thermal conductivity and a relatively low light absorptivity such as nitrides and carbides is provided on the reflective layer to improve the heat diffusion function of the reflective layer. This method is thought to be effective to clear the defects occurring when a thin layer is used.

However, these materials such as nitrides and carbides have a large stress so that the heat diffusion layer tends to crack. As a result, there is a problem in that optical discs having such a heat diffusion layer cannot obtain sufficient overwriting characteristics.

Because of these reasons, a need exists for a multilayer phase change information recording medium which has excellent overwrite characteristics even when the reflective layer contained in the information layer is thin.

SUMMARY OF THE INVENTION

Accordingly, an object of the present invention is to provide a multilayer phase change information recording medium which has excellent overwrite characteristics even when the reflective layer contained in the information layer is thin. By the multilayer phase change information recording medium, for example, density when recording signals therein can be increased. Another object of the present invention is to provide a recording and playback method for the medium.

Briefly this object and other objects of the present invention as hereinafter will become more readily apparent can be attained by a multilayer phase change information recording medium including plural information layers including at least a first information layer and a last information layer. Each information layer contains a recording layer in which information can be recorded by utilizing a phase change between a crystalline phase and an amorphous phase. At least one of the plural information layers other than the last information layer includes a first lower protective layer, a first recording layer located overlying the lower protective layer, a first upper protective layer located overlying the first recording layer, a first reflective layer located overlying the first upper protective layer, and a heat diffusion layer which is located overlying the first reflective layer and which mainly includes In, Zn and O.

It is preferable that in the multilayer phase change information recording medium, an atomic ratio $Zn/(In+Zn)$ in the aforesaid heat diffusion layer is from 0.05 to 0.5.

It is also preferable that in the multilayer phase change information recording medium, the aforesaid heat diffusion layer further includes at least one halogen.

It is also preferable that in the multilayer phase change information recording medium, the aforesaid heat diffusion layer further includes at least one metal having a positive three or more valence and the following relationship is satisfied: $M/(In+Zn+M) \leq 0.2$. In this relationship, In and Zn represent atomic ratios of In and Zn in the heat diffusion layer, respectively, and M represents a sum of atomic ratios of the at least one metal element.

It is further preferable that in the multilayer phase change information recording medium, the aforesaid heat diffusion layer further includes at least one metal having a positive three or more valence and at least one halogen and the following relationship is satisfied: $0.01 \leq X/(In+Zn+M) \leq 0.3$. In this inequality, In and Zn represent atomic ratios of In and Zn in the heat diffusion layer, respectively, M represents a sum of atomic ratios of the at least one metal element and X represents a sum of atomic ratios of the at least one halogen element.

It is also preferable that the halogen included in the aforesaid heat diffusion layer in the multilayer phase change information recording medium be fluorine.

It is also preferable that the aforesaid heat diffusion layer in the multilayer phase change information recording medium have a thickness of from 10 to 200 nm.

It is also preferable that the first recording layer in the multilayer phase change information recording medium include Sb and Te, and at least one element selected from the group consisting of Ag, In, Ge, Se, Sn, Al, Ti, V, Mn, Fe, Co, Ni, Cu, Zn, Ga, Bi, Si, Dy, Pd, Pt, Au, S, B, C and P.

It is also preferable that the first recording layer in the multilayer phase change information recording medium have a thickness of from 3 to 15 nm.

It is also preferable that the first reflective layer in the multilayer phase change information recording medium include at least one element selected from the group of Au, Ag, Cu, W, Al and Ta.

It is also preferable that the first reflective layer in the multilayer phase change information recording medium have a thickness of from 3 to 20 nm.

It is also preferable that recording medium comprises a double layer phase change information recording medium further including a first substrate, a second substrate and an intermediate layer, wherein the plural information layers are the first information layer and the last information layer. Both information layers are sandwiched by the first substrate and the second substrate and the intermediate layer is sandwiched by the first information layer and the last information layer. The last information layer includes a second lower protective layer, a second recording layer located overlying the second lower protective layer, a second upper protective layer located overlying the second recording layer, and a second reflective layer located overlying the second upper protective layer.

It is also preferable that the first information layer in the double layer phase change information recording medium have an optical transmittance of 40 to 70% for light having a wavelength of from 350 to 700 nm.

It is also preferable that the double layer phase change information recording medium further include a transparent layer located between the first substrate and the first lower protective layer.

It is also preferable that the double layer phase change information recording medium further include a barrier layer located on at least one of a position between the first upper protective layer and the first reflective layer and a position between the second upper protective layer and the second reflective layer.

It is also preferable that the first substrate in the double layer phase change information recording medium have a thickness of from 10 to 600 µm.

As yet another aspect of the present invention, a method of recording information in the multilayer phase change information recording medium, which includes the step of irradiating the plural information layers with a light beam which has a wavelength of from 350 to 700 nm from a side of the first information layer to record information in the plural information layers, is provided.

As yet another aspect of the present invention, a method of recording information and playing back information in the multilayer phase change information recording medium is provided. The method includes the steps of (A) irradiating the plural information layers with a light beam which has a wavelength of from 350 to 700 nm from a side of the first information layer to record information in the plural information layers, and (B) irradiating the plural information layers with a light beam which has a wavelength of from 350 to 700 nm from a side of the first information layer to play back the information recorded in the plural information layers.

That is, the multilayer phase change information recording medium of the present invention is characterized by having the following structure to record and play back information. The structure is that the medium contains plural information layers comprising at least a first information layer and a last information layer, each of which includes a recording layer made of a phase change material, and an intermediate layer is sandwiched between each information layer. The phase change material phase-changes between a crystalline state and an amorphous state upon application of a laser beam. At least one information layer other than the last information layer which receives the laser beam last includes a first lower protective layer, a first recording layer located overlying the lower protective layer, a first upper protective layer located overlying the first recording layer, a first reflective layer located overlying the first upper protective layer, and a heat diffusion layer which is located overlying the first reflective layer and which includes In, Zn and O as main components. "Main components" means that the sum of atomic ratios of In, Zn and O in the heat diffusion layer occupies not less than 80 atomic % and preferably not less than 90 atomic %.

As to the lower protective layer, the recording layer made of a phase change material, the upper protective layer and the reflective layer, known technologies are applicable. However, the characteristic of the multilayer phase change information recording medium of the present invention is that the above-mentioned problems are solved by specific materials for use in the heat diffusion layer.

Additionally, it is not necessary for light to transmit through the last information layer. Therefore, a thick reflective layer can be used for the last information layer, which relieves the need for a heat diffusion layer to be provide for it. Therefore, when providing a heat diffusion layer to the last recording layer in the last information layer, the materials mainly used for the heat diffusion layer are not necessarily In, Zn and O.

For the reflective layer, Ag containing compounds are known as a suitable material. This is because Ag containing compounds have a refraction index (n) not greater than 0.5 even in a blue ray wavelength region as mentioned in, for example, ISOM2001 Technical Digest P202, and therefore can limit light absorption to a low level.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

The inventors of the present invention have intensively studied to solve the issues in the prior art discussed above and found a phase change information recording medium which can solve the issues.

The optical recording medium and the information recording and playback method according to the present invention will be described below.

Figure 1:
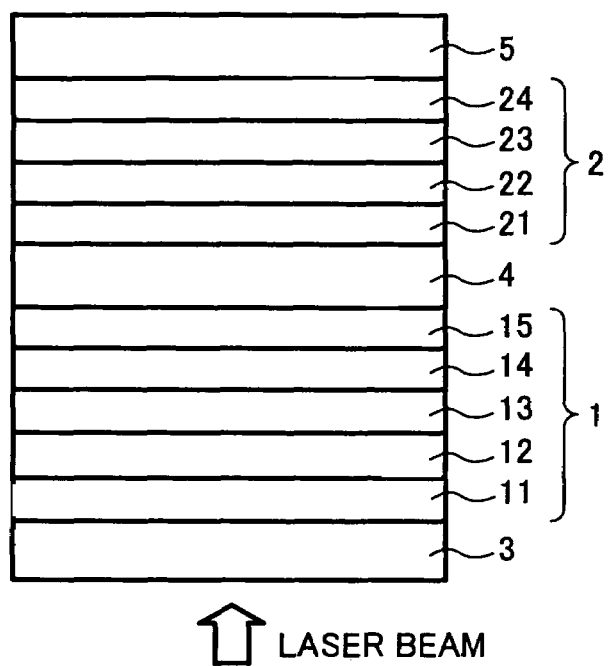
FIG. 1 is a schematic cross sectional diagram for explaining an embodiment of the double layer phase change information recording medium of the present invention.

FIG. 1 is a schematic cross sectional view of an embodiment of the double layer information recording medium of the present invention. The medium has a structure in which a first information layer 1, an intermediate layer 4, a second information layer 2, and a second substrate 5 are located on a first substrate 3 in this order.

The first information layer 1 is formed of a first lower protective layer 11, a first recording layer 12, a first upper protective layer 13, a first reflective layer 14 and a heat diffusion layer 15. The second information layer 2 is formed of a second lower protective layer 21, a second recording layer 22, a second upper protective layer 23 and a second reflective layer 24. A barrier layer 16 can be optionally provided between the first upper protective layer 13 and the first reflective layer 14 and another barrier layer 25 can be optionally provided between the second upper protective layer 23 and the second reflective layer 24.

However, the first information layer 1 and the second information layer 2 of the present invention are not limited to the layers explained above.

Figure 2:
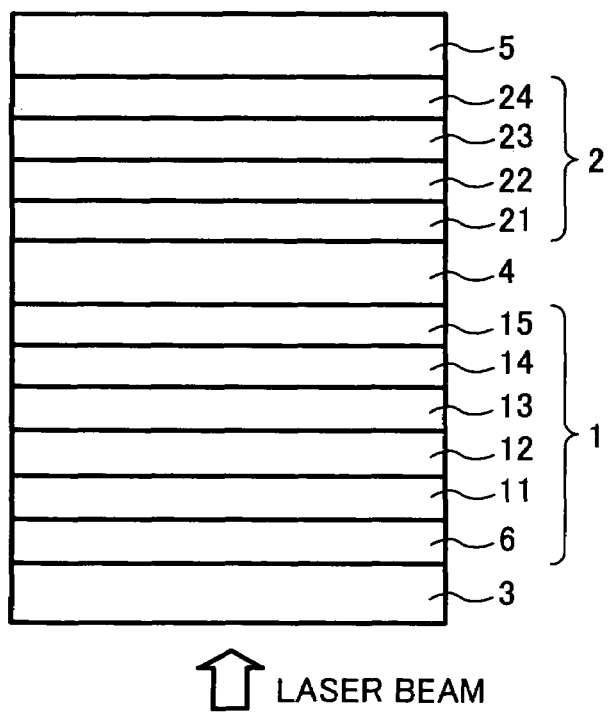
FIG. 2 is a schematic cross sectional diagram for explaining another embodiment of the double layer phase change information recording medium of the present invention.

FIG. 2. is a schematic cross sectional view of another embodiment of the double layer information recording medium of the present invention. A transparent layer 6 can be optionally provided between the first substrate 3 and the first lower protective layer 11. The transparent layer 6 is provided when a thin sheet substrate is used and when the medium is not manufactured by the method for the medium illustrated in FIG. 1. It is easy to manufacture a double layer information recording medium as illustrated in FIG. 1 by forming the first information layer 1 on the first substrate 3 and the second information layer 2 on the second substrate 5 and bonding the substrates with a bonding layer therebetween. However, when it is difficult to form the first information layer 1 on the first substrate layer 3, for example, when the first substrate 3 is too thin, a double layer information recording medium as illustrated in FIG. 2 which includes the transparent layer 6 can be manufactured as follows: the intermediate layer 4 is formed on the second information layer 2; further the first information layer 1 is formed on the intermediate layer 4; and furthermore the first substrate 3 are bonded to the first information layer with the transparent layer 6 therebetween.

The first substrate 3 needs to sufficiently transmit light used for recording and playback. Substrates known in this field can be used as the first substrate 3.

Specific examples of such materials for use as the first substrate 3 include glass, ceramics or resins. Especially resins are preferable in the light of moldability and cost.

Specific examples of such resins include polycarbonate resins, acrylic resins, epoxy resins, polystyrene resins, acrylic nitrile-styrene copolymer resins, polyethylene resins, polypropylene resins, silicone compound resins, fluoride containing resins, ABS resins and urethane resins. Among them, acrylic resins such as polycarbonate resins and polymethyl methacrylate (PMMA) are preferable because they are excellent in moldability, optical characteristics and cost.

If necessary, the first substrate 3 can have convexo-concave patterns on a surface thereof on which an information layer is to be formed. The patterns are typically groove portions and land portions, and are spirally or concentrically formed for laser beam tracking. Typically such patterns are formed by a molding method such as injection molding methods or photopolymer methods. The first substrate 3 preferably has a thickness of from about 10 μm to about 600 μm.

For the second substrate 5, materials opaque to light used for recording and playback can be used as well as the same material as that of the first substrate 3. Also a groove having a different form from that of the first substrate 3 can be formed on the second substrate 5. There is no limit to the thickness of the second substrate 5 but it is preferable that the total thickness of the first substrate 3 and the second substrate 5 is 1.2 mm.

The intermediate layer 4 and the transparent layer 6 preferably have a low light absorptivity for light used for recording and playback. As for materials, resins are preferably used for the layers in the light of moldability and cost. Specific examples of such resins include ultraviolet curing resins and thermoplastic resins.

On the second substrate 5 and the intermediate layer 4, convexo-concave patterns of grooves and guide grooves similar to those formed on the first substrate 3 can be formed by a method such as injection molding methods and photopolymer methods.

The intermediate layer 4 is provided so that a pickup can optically discriminate the first information layer and the second information layer. The thickness of the intermediate layer 4 is preferably from 10 to 50 μm. When the intermediate layer 4 is too thin, a crosstalk tends to occur between the layers. When the intermediate layer 4 is too thick, spherical aberration may occur at the time of recording and playing back information in the second information layer 2 and therefore recording and playback of information therein tend to be difficult.

There is no limit to the thickness of the transparent layer 6. However, it is necessary to make an adjustment such that the optimal thickness of the first substrate 3, on which no transparent layer is formed as illustrated in FIG. 1, is approximately equal to the sum of the thickness of the first substrate 3, on which the transparent layer 6 is formed as illustrated in FIG. 2 and the thickness of the transparent layer 6. For example, assume that when the thickness of the first substrate 3 of the optical information recording medium illustrated in FIG. 1 is 100 μm, excellent recording and erasing performances can be obtained under the condition that NA is 0.85. In this case, when the optical information recording medium illustrated in FIG. 2 is used instead, the thicknesses of the first substrate 3 and the transparent layer 6 are, for example, each 50 μm.

The first recording layer 12 and the second recording layer 22 are typically made of phase change materials which change their phases between a crystalline phase and an amorphous phase upon application of heat using laser light and followed by cooling.

Specific examples of such materials include thin films which include, as a main component, chalcogen alloyed metals such as Ge—Te, Ge—Te—Sb and Ge—Sn—Te-based alloyed metals and Sb—Te-based eutectic material films. Especially Sb—Te-based eutectic materials are preferable in the light of recording (amorphous phase) sensitivity and speed, and erase ratio. In the present application, "main component" means a component which is included in the film in an amount not less than 90 atomic %. There is no limit to the phase change materials mentioned above and other phase change materials known in this field can also be used.

In order to improve performance and reliability, elements such as Ag, In, Ge, Se, Sn, Al, Ti, V, Mn, Fe, Co, Ni, Cu, Zn, Ga, Bi, Si, Dy, Pd, Pt, Au, S, B, C and P and impurities can be added to the recording layer.

These recording layers can be formed by various kinds of vapor phase growth methods such as vacuum deposition methods, sputtering methods, plasma CVD methods, optical CVD methods, ion plating methods and electron beam evaporation methods. Especially sputtering methods excel in mass productivity and film quality.

Although the thickness of the first recording layer 12 is not particularly limited, it is preferably from 3 to 15 nm. When the recording layer is too thin, the recording layer tends not to be uniform. When the thickness is too thick, the light transmittance tends to deteriorate.

Although the thickness of the second. recording layer 22 is not particularly limited, it is preferably from 3 to 20 nm. When the recording layer is too thin, the formed layer tends not to be uniform. Also when the thickness is too thick, the recording sensitivity tends to deteriorate.

The first reflective layer 14 and the second reflective layer 24 are formed such that an amorphous state is easily achieved by efficiently utilizing incident light and the cooling speed is increased. Therefore, metals having a high thermal conductivity are typically used for the layers.

Specific examples of such metals include Au, Ag, Cu, W, Al, Ta and alloys thereof. In addition to the material which includes at least one of these metals as a main component, at least one element selected from the group consisting of Cr, Ti, Si, Pd, Ta, Nd and Zn can be added. In the present application, "main component" means a component which is included in the reflective layer in an amount not less than 90 atomic % and preferably not less than 95 atomic %. Especially, Ag containing materials can limit light absorbance to a low level because a refraction index (n) thereof is as low as not greater than 0.5 even in the blue ray wavelength region. Therefore Ag containing materials are preferable for media such as multilayer information recording media of the present invention, especially for the reflective layer in the first information layer.

Such reflective layers can be formed by various kinds of vapor phase growth methods such as vacuum deposition methods, sputtering methods, plasma CVD methods, optical CVD methods, ion plating methods and electron beam evaporation methods. Especially sputtering methods excel in mass productivity and film quality.

The first information layer 1 is required to have a high light transmittance. Therefore, it is preferable to use Ag and alloy metals thereof, which have a low reflective index and a high thermal conductivity, for the reflective layer 14. The thickness thereof is preferably from about 3 to about 20 nm. When the thickness is too thin, the resultant layer tends not to be uniform. When the thickness is too thick, the light transmittance tends to be low so that recording and playback can be difficult in the second information layer 2.

The thickness of the second reflective layer 24 in the second information layer 2 is from 50 to 200 nm and preferably from 80 to 150 nm. When the thickness is too thin, the repetitive recording characteristics of the layer tend to deteriorate. Also when the layer is too thick, it is not preferable because the sensitivity thereof tends to deteriorate.

Functions and materials of the first lower protective layer 11, the second protective layer 21, the first upper protective layer 13 and the second upper protective layer 23 are the same as those in the case of a single layer phase change information recording medium. Namely, the functions thereof are protection of the first recording layer 12 and the second recording layer 22 from deteriorating, enhancement of the adhesion of the recording layer to the adjacent layers and improvement of the recording characteristics. Specific examples of the materials for use in the protection layers include metal oxides such as SiO, $SiO_2$, ZnO, $SnO_2$, $Al_2O_3$, $TiO_2$, $In_2O_3$ and MgO and $ZrO_2$, nitrides such as $Si_3N_4$, AlN, TiN and ZrN, sulfides such as ZnS, $In_2S_3$ and $TaS_4$, carbides such as SiC, TaC, $B_4C$, WC, TiC and ZrC, diamond like carbon and mixtures thereof.

These materials can be used alone or in combination to form a protective layer. Also impurities can be contained therein if necessary. The protective layer is required to have a higher melting point than that of the recording layer. Specifically, mixtures of ZnS and $SiO_2$ are more preferable.

These protective layers can be formed by various kinds of vapor phase growth methods such as vacuum deposition methods, sputtering methods, plasma CVD methods, optical CVD methods, ion plating methods and electron beam evaporation methods. Especially sputtering methods excel in mass productivity and film quality.

It is preferable that each of the first lower protective layer 11 and the second lower protective layer 21 have a thickness of from 60 to 200 nm. When the thickness thereof is too thin, the first substrate or the intermediate layer may be transformed by the heat upon recording. When the thickness is too thick, mass productivity deteriorates. The layer thickness of these layers needs to be designed such that the reflectivity is maximized.

The first upper protective layer 13 and the second upper protective layer 23 preferably have a layer thickness of from 3 to 40 nm. When the layer thickness is too thin, the recording sensitivity thereof tends to deteriorate. When the layer thickness is too thick, the heat diffusion effects tend to be lost.

The multilayer phase change information recording medium of the present invention can have a barrier layer between an upper protective layer and a reflective layer. As discussed above, alloyed metals containing Ag and a mixture of ZnS and $SiO_2$ are preferable for the reflective layer and the protective layer, respectively. However, when the two layers are adjacent to each other, sulfur contained in the protective layer can corrode Ag in the reflective layer, which may adversely affect preservation reliability of the recording medium. Therefore, when a reflective layer includes an Ag containing compound, it is preferable to provide a barrier layer to deal with this defect. Such a barrier layer needs to contain no sulfur and to have a higher melting point than that of the recording layer. Specific examples of the materials for use in the barrier layer include metal oxides such as SiO, ZnO, $SiO_2$, $SnO_2$, $Al_2O_3$, $TiO_2$, $In_2O_3$ and MgO and $ZrO_2$, nitrides such as $Si_3N_4$, AlN, TiN and ZrN, carbides such as SiC, TaC, $B_4C$, WC, TiC and ZrC, and mixtures thereof. The barrier layer preferably has a low light absorptivity for the laser beam used for recording and playback.

The barrier layers can be formed by various kinds of vapor phase growth methods such as vacuum deposition methods, sputtering methods, plasma CVD methods, optical CVD methods, ion plating methods, electron beam evaporation methods. Especially sputtering methods excel in mass productivity and film quality.

The thickness of such barrier layers is preferably from 2 to 10 nm. When the layer thickness is less than 2 nm, Ag may be corroded so that the preservation reliability may deteriorate. When the layer thickness is thicker than 10 nm, the heat diffusion effects tend to deteriorate.

The heat diffusion layer 15 preferably has a large thermal conductivity to rapidly cool down the recording layer 12 which has been heated by a laser beam. Also the heat diffusion layer 15 preferably has a low light absorptivity for the laser beam so that recording and playback can be performed in the last information layer located at the far end. The heat diffusion layer 15 preferably has the extinction coefficient not greater than 1.0 and more preferably not greater than 0.5 for the laser beam used for recording and playback. When the extinction coefficient is too great, the light absorptivity of the first information layer tends to increase so that recording and playback in the second information layer may become difficult.

The heat diffusion layer is a characterizing portion of the present invention and has the functions discussed above and improves overwrite characteristics by using In, Zn and O as main components. Specifically, mixtures of indium oxides and zinc oxides are preferably used therefor. It is preferable that the heat diffusion layer satisfies the following relationship: $0.05 \leq Zn/(In+Zn) \leq 0.5$, and more preferably, $0.05 \leq Zn/(In+Zn) \leq 0.3$, wherein Zn and In represent atomic ratios of In and Zn in the heat diffusion layer, respectively. When the ratio is too small, preservation reliability tends to degrade. When the ratio is too large, the thermal conductivity tends to worsen and the overwrite characteristics tend to degrade. Further, other elements and compounds can be added for the purpose of improving reliability and so on. For example, halogenated compounds and oxides are preferable as such additives to secure a sufficient light absorptivity in the short wavelength range.

In addition, the heat diffusion layer can further include at least one metal element which has positive three or more valence. Specific examples of the metal element include Sn, Al, Sb, Ga, Ti, Si, Zr, Ge, V, W, La and Ru. Especially Sn is preferable in light of improvement of thermal conductivity.

In this case, the heat diffusion layer preferably satisfies the following relationship: atomic ratio $M/(In+Zn+M) \leq 0.2$, and preferably $M/(In+Zn+M) \leq 0.1$, wherein In and Zn represent atomic ratios of In and Zn in the heat diffusion layer, respectively, and M represents a sum of atomic ratios of the at least one metal element. When the atomic ratio is too large, the thermal conductivity tends to decrease.

When the heat diffusion layer of the present invention includes a halogen, the heat diffusion layer preferably satisfies the following relationship: atomic ratio $0.01 \leq (X)/(In+Zn+M) \leq 0.3$, wherein In and Zn represent atomic ratios of In and Zn in the heat diffusion layer, respectively, M represents a sum of atomic ratios of the at least one metal element and X represents a sum of atomic ratios of the at least one halogen element. When the atomic ratio is less than 0.01, the addition of halogen has substantially no effect on improvement of the thermal conductivity and light transmittance in the short wavelength region. When the atomic ratio is greater than 0.3, the thermal conductivity tends to decrease. Therefore, the atomic ratio is more preferably not greater than 0.2. When the atomic ratio is not less than 0.1, the thermal conductivity tends to decrease. In this case, it is preferable that the film thickness of the heat diffusion layer be not less than 80 nm. In addition, when calculating the atomic ratio for the heat diffusion layer containing no third metal element, zero is assigned to the value of the third metal element in the inequality shown above.

Specific examples of the halogens include F, Cl, Br and I. Especially F is preferable to impart a relatively high thermal conductivity to the heat diffusion layer compared to the other halogens.

The heat diffusion layer can be formed by various kinds of vapor phase growth methods such as vacuum deposition methods, sputtering methods, plasma CVD methods, optical CVD methods, ion plating methods and electron beam evaporation methods. Especially sputtering methods excel in mass productivity and film quality.

The thickness of the heat diffusion layer 15 is preferably from 10 to 200 nm. When the layer thickness is too thin, the heat diffusion effect may be lost. When the thickness is too thick, the stress tends to increase. As a result, repetitive overwrite characteristics tend to deteriorate and mass productivity may be adversely affected.

Besides, it is preferable that the first information layer 1 in the double layer phase change information recording medium of the present invention have a light transmittance of from 40 to 70%, and more preferably from 45 to 60% for the laser beam used for recording and playback.

Areas of the recording layer in an amorphous state in which information has been recorded after initialization are small relative to those in a crystalline state. Therefore, there is no problem if the light absorptivity of the area in the amorphous state is relatively low compared with that of the area in the crystalline state.

Next, the method of manufacturing the phase change information recording medium of the present invention will be described.

One of the methods, of manufacturing the double layer phase change information recording medium of the present invention includes the processes of filming, initializing and bonding. Typically, each process is performed in this order.

Figure 3:
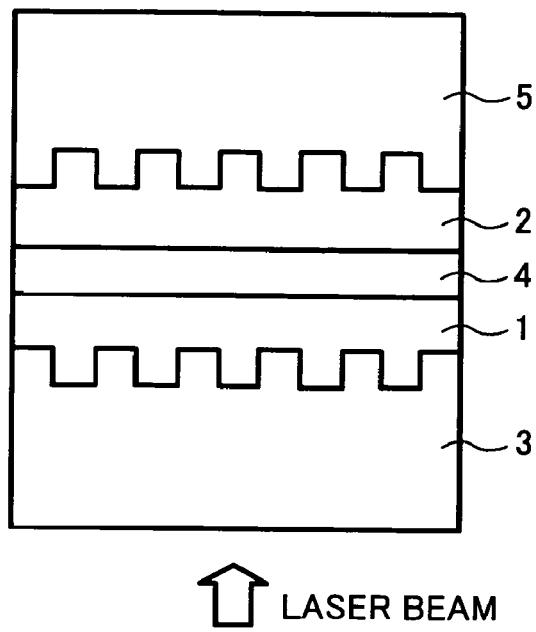
FIG. 3 is a schematic cross sectional diagram illustrating a double layer phase change information recording medium having the first information layer and the second information layer on which a groove is provided.

FIG. 3 is a schematic cross sectional view of the double layer phase change information recording medium manufactured by this method. Grooves are formed on the first substrate 3 and the second substrate 5.

In the filming process, a medium in which the first information layer 1 is formed on the surface of the first substrate 3 on which a groove is formed and another medium in which the second information layer 2 is formed on the surface of the second substrate 5 on which a groove is formed are separately manufactured.

Each layer constituting the first information layer 1 and the second information layer 2 is formed by various kinds of vapor phase growth methods such as vacuum deposition methods, sputtering methods, plasma CVD methods, optical CVD methods, ion plating methods and electron beam evaporation methods.

Especially sputtering methods excel in mass productivity and film quality. In sputtering methods, filming is generally performed while inert gas such as argon gas is flown. In this process, reaction sputtering can also be performed while a mixture gas such as oxygen and nitrogen is used with the inert gas.

In the initialization process, the entire face is initialized by applying energy light such as a laser beam to the first information layer 1 and the second information layer 2, thereby crystallizing the recording layers.

In the initialization process, the film in an information layer may be caused to be separated due to energy of a laser beam. In order to avoid such separation, the first information layer 1 and the second information layer 2 can be subjected to spin-coating using a material such as UV resins, followed by curing the materials with ultra violet rays before the initialization process.

Also the first information layer 1 and the second information layer 2 can also be initialized from the side of the first substrate after the next process, i.e., the bonding process.

Next, the initialized medium as prepared above in which the first information layer 1 is formed on the surface of the first substrate 3 is bonded with the other medium initialized as prepared above in which the second information layer 2 is formed on the face of the second substrate 5 with the intermediate layer 4 therebetween such that the first information layer 1 and the second information layer 2 face each other as illustrated in FIG. 3.

Specifically, a UV curing resin for forming an intermediate layer, is spin-coated on the information layer 1 or 2 and then both the media are pressurized and bonded with both the information layers 1 and 2 facing each other. Then the intermediate layer is cured by applying ultra violet rays thereto.

Also, another method of manufacturing the double layer information recording medium of the present invention illustrated in FIG. 2 will be described. This method includes the processes of a first filming process, an intermediate layer forming process, a second filming process, a substrate bonding process and an initialization process. Typically, each process is performed in this order.

Figure 4:
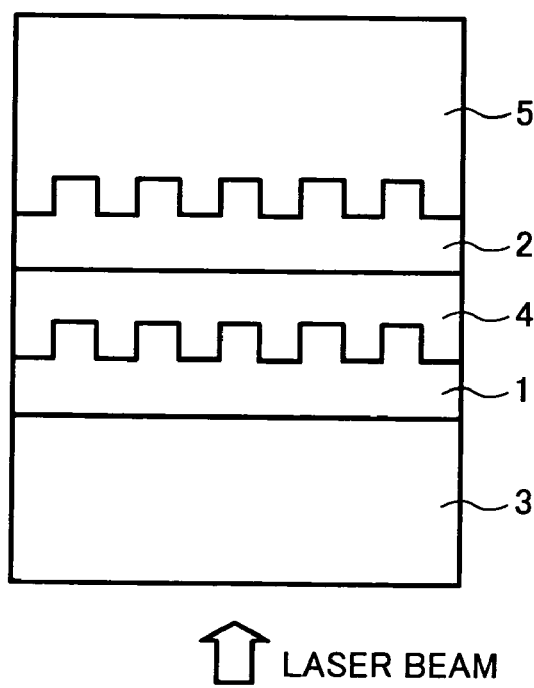
FIG. 4 is a schematic cross sectional diagram illustrating a double layer phase change information recording medium having the first layer and the intermediate layer on which a groove is provided.

FIG. 4 is a schematic cross sectional view illustrating the double layer phase change information recording medium manufactured by this method. Grooves are formed on the intermediate layer 4 and the second substrate 5.

In the first filming process, the second information layer 2 is formed on the face of the second substrate 5 on which the guiding groove is formed. The filming process is as mentioned above.

In the intermediate layer forming process, the intermediate layer 4 having a guide groove is formed on the second information layer 2.

For example, a UV curing resin is spread on the entire face of the second information layer 2 and is cured by applying ultra violet rays thereto while the resin is pressed by a stamper which is made of a material capable of transmitting ultra violet rays. The guiding groove is thus made on the intermediate layer 4.

In the second filming process, the first information layer 1 is formed on the intermediate layer 4. The filming method is as mentioned above.

In the substrate bonding process, the first information layer 1 and the first substrate 3 are bonded with the transparent layer 6 therebetween.

For example, a UV curing resin for forming the transparent layer 6, is spin-coated on either the first information layer 1 or the first substrate 3 and then the first information layer 1 and the first substrate 3 are bonded. Thereafter, the transparent layer 6 is cured by applying ultra violet rays thereto.

The transparent layer 6 is not necessarily formed. For example, it is also allowed to form the first substrate 3 by spreading and curing a resin material thereof onto the first information layer 1.

In the initialization process, the entire faces of the first information layer 1 and the second information layer 2 are initialized by applying energy light such as a laser beam thereto from the side of the first substrate 3, resulting in crystallization of the recording layers. The second information layer 2 can be initialized immediately after the process of forming the intermediate layer 4.

Figure 5:
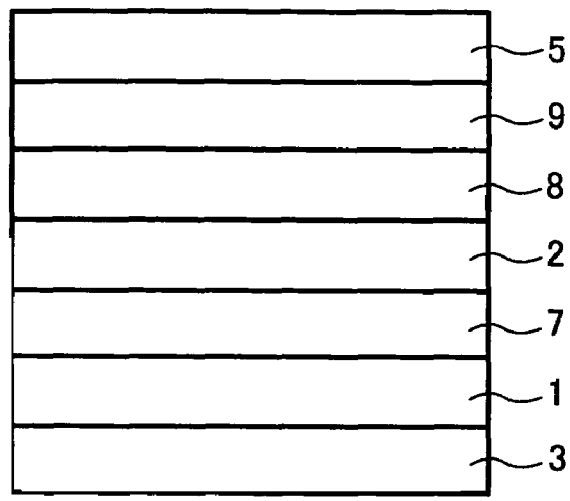
FIG. 5 is a diagram illustrating an embodiment of the phase change information recording medium of the present invention having three information layers.

Furthermore, the phase change information recording medium having triple information layers illustrated in FIG. 5 is manufactured in the following process order:

First filming process (filming the first information layer 1 on the first substrate 3 and filming a third information layer 9 on the second substrate 5); intermediate layer forming process (forming a second intermediate layer 8 on the third information layer 9 of the second substrate 5); second filming process (filming the second information layer 2 on the second intermediate layer 8 of the second substrate 5); bonding process (bonding the first substrate 3 and the second substrate 5 through the intermediary of a first intermediate layer 7 with the first information layer 1 and the second information layer 2 facing each other); and initialization process.

The initialization process can be performed immediately after filming each information layer.

Figure 6:
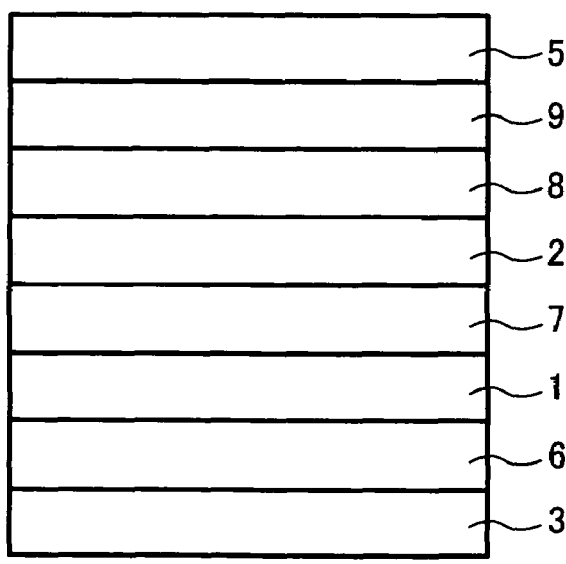
FIG. 6 is a diagram illustrating another phase change information recording medium embodying the invention and having three information layers.

Furthermore, the phase change information recording medium having triple information layers illustrated in FIG. 6 are manufactured in the following process order:

First filming process (filming the third information layer 9); first intermediate layer forming process (forming the second intermediate layer 8); second filming process (forming the second information layer 2); second intermediate layer forming process (forming the first intermediate layer 7); third filming process (filming the first information layer 1); bonding process of the first substrate (bonding the first information layer 1 and the first substrate 3 with the transparent layer 6 therebetween); and initialization process.

The initialization process for the third information layer 9 can be performed immediately after the first filming process or the second intermediate layer forming process. The second information layer 2 can be initialized immediately after the second filming process or after the first intermediate layer 1 is formed. The first information layer 1 can be initialized after the third filming process.

Figure 7:
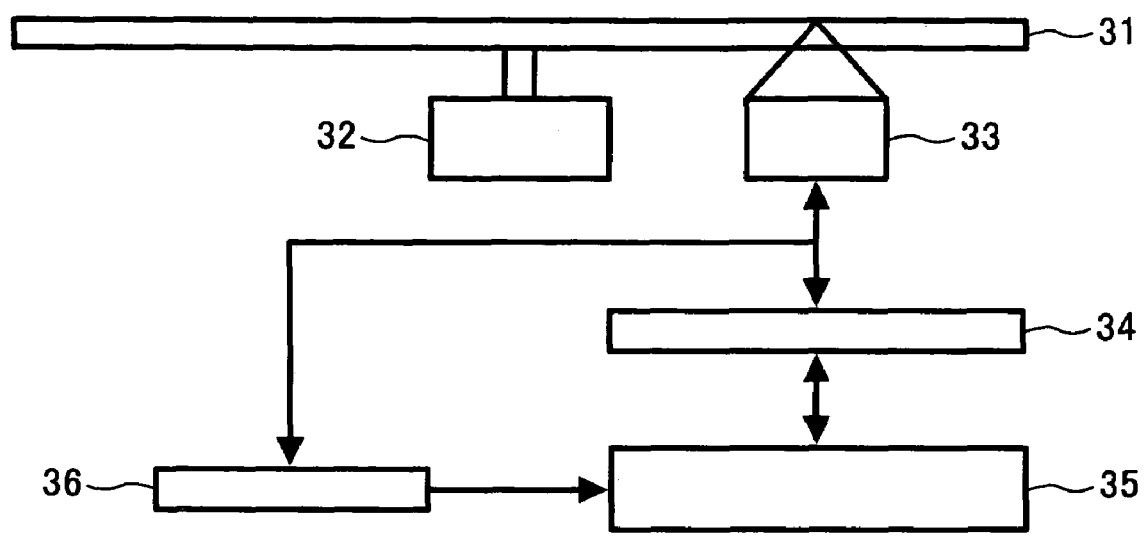
FIG. 7 is a diagram illustrating an information recording/reproducing apparatus for use in the present, invention which can record and play back information in the phase change optical information recording medium of the present invention.

FIG. 7 illustrates an information recording/reproducing apparatus for use in the present invention which can record and play back information in the phase change optical information recording medium of the present invention.

Referring to FIG. 7, numeral 31 denotes an optical information recording medium, i.e., the phase change optical information recording medium of the present invention. The recording medium 31 is rotated by a driving device including a spindle motor 32. A laser driving circuit 34, which is light source driving means, drives a light source including a laser diode. A record/playback pickup 33 irradiates the recording medium 1 with laser light, which is emitted by the laser diode via an optical system (not shown), to cause a phase change in the recording layer of the recording medium 31.

When light irradiates the thus phase-changed recording layer and the reflected light is received by the record/playback pickup 33, the recorded information can be played back. A wave form processing circuit 36 measures the signal level of the reproduced HF signals to determine the optimum CW erase power (Pecw) and optimum writing power (Pwo).

The optimum writing power of the record/playback pickup 33 is set by a writing-power/erasure-power setting circuit 35.

Having generally described this invention, further understanding can be obtained by reference to certain specific examples which are provided herein for the purpose of illustration only and are not intended to be limiting.

EXAMPLES

Preparatory Experiment

As a preparatory experiment, an approximately 200 nm layer, i.e., a heat diffusion layer, was formed on a glass substrate using a disc sputtering apparatus which is manufactured by Balzers. The target used mainly consisted of In, Zn and O, wherein the atomic ratio (Zn/(In+Zn) is 0.1. Sputter gas used was a mixture of Ar and $O_2$. A proper flow rate of $O_2$ gas was determined such that the thin layer can have the lowest electric resistivity with the flow rate of $O_2$ gas changing while keeping the flow rate of Ar gas constant in sputtering. The electric resistivity was measured by a four-terminal method.

Example 1-1

A double layer phase change information recording medium was manufactured as follows.

(1) The following layers were overlaid on a first substrate by a sputtering method in Ar atmosphere in the following order. The first substrate is made of a polycarbonate resin which has a diameter of 12 cm and a thickness of 0.6 mm. The polycarbonate resin has convexo-concave patterns of continuous tracking guides on the surface thereof.

| | |
|---|---|
| First lower protective layer consisting of $(ZnS)_{80} \bullet (SiO_2)_{20}$ | 120 nm |
| First recording layer consisting of $Ge_5Ag_1In_2Sb_{70}Te_{22}$ | 6 nm |
| First upper protective layer consisting of $(ZnS)_{80} \bullet (SiO_2)_{20}$ | 15 nm |
| First reflective layer consisting of $Ag_{96}Zn_3Al_1$ | 10 nm |
| Heat diffusion layer consisting of In—Zn—O | 120 nm |

For only the heat diffusion layer, a mixture gas of Ar and $O_2$ was used with flow rates of 10 sccm for Ar and of 0.2 sccm for $O_2$ which were previously determined in the preparatory experiment.

(2) The following layers were formed in the following order on a second substrate, which is the same as the first substrate, by a sputtering method in Ar atmosphere.

| | |
|---|---|
| Second reflective layer consisting of $Al_{98}Ti_2$ | 120 nm |
| Second upper protective layer consisting of $(ZnS)_{80} \bullet (SiO_2)_{20}$ | 20 nm |
| Second recording layer consisting of $Ge_4Ag_1In_3Sb_{70}Te_{22}$ | 12 nm |
| Second lower protective layer consisting of $(ZnS)_{80} \bullet (SiO_2)_{20}$ | 130 nm |

(3) The light transmittance of the first information layer against light having a wavelength of 405 nm was measured from the direction of the first substrate by a spectrophotometer manufactured by Shimadzu Corp.

(4) A laser beam irradiated the first information layer from the side of the first substrate and the second information layer from the opposite side of the second substrate for initialization.

(5) The light transmittance of the first information layer for light having a wavelength of 405 nm was again measured.

(6) A UV curing resin was spin-coated on the surface of the first information layer.

(7) An intermediate layer was formed by irradiating the UV curing resin with ultraviolet rays from the side of the first substrate.

(8) The surface of the first information layer was bonded to the surface of the second information layer of the second substrate with the intermediate layer therebetween.

The intermediate layer had a thickness of 35 µm.

Comparative Example 1-1

A double layer phase change information recording medium was manufactured in the same way as in Example 1-1 except that the material used for the heat diffusion layer was changed to AlN.

Comparative Example 1-2

A double layer phase change information recording medium was manufactured in the same way as in Example 1-1 except that the material used for the heat diffusion layer was changed to SiC.

Comparative Example 1-3

A double layer phase change information recording medium was manufactured in the same procedure as in Example 1-1 except that the material used for the heat diffusion layer was changed to $TiO_2$.

Recording was performed on each disc under the following conditions.

| | |
|---|---|
| Laser wavelength | 405 nm |
| NA = 0.65 | |
| Linear Velocity | 6.0 m/s |
| Track pitch | 0.43 μm |

Jitters of marks formed in the first information layer and the second information layer at a line density of 0.18 μm/bit and jitters thereof after 1000-time overwriting were measured.

The results are shown in Table 1.

The heat diffusion layer of Example 1-1, mainly contained In and Zn with an atom ratio Zn/(In+Zn) being 0.1. Judging from the fact of the light transmittance being greater than 40% and of the jitters of the marks formed in the first information layer and the second information layer after one-time recording being not greater than 9%, the double layer phase change information recording medium of Example 1-1 is excellent.

In Comparative Example 1-1, aluminum nitride was used in the heat diffusion layer. Since the heat diffusion layer had a thickness of 120 nm, a number of cracks were observed with a naked eye. Therefore, recording and playback were impossible.

In Comparative Examples 1-2 and 1-3, silicon carbide and titanium oxide were used for the heat diffusion layers, respectively. Both light transmittances of the respective first information layers were not greater than 40%, the sensitivities of the second information layers were poor and the jitters were large. The number of times of repeated overwriting was less than a thousand times.

Judging from the results discussed above, it is preferable that materials mainly consisting of In, Zn and O be used for the heat diffusion layer of the first information layer.

2-5 were manufactured in the same way as in Example 1-1 except for using these targets for the heat diffusion layer and forming a barrier layer of $(TiO_2)_{80}(TiC)_{20}$ having a thickness of 3 nm between the first protective layer and the first reflective layer.

Recording was performed on each medium under the same conditions as those in Example 1-1 and then jitters of the marks formed in the first information layer and the second information layer were measured. Jitters were also measured after 1000-time overwriting. Further, in order to check preservation reliability, each medium in which information had been recorded was preserved at 80° C. and 85% RH for 300 hours to evaluate jitters of the first recording marks.

In the medium of Comparative Example 2-1, Zn was not added in the heat diffusion layer but the overwriting characteristics were excellent. However, jitters after the preservation test were not less than 15%, meaning that the preservation reliability deteriorated.

It was found that when Zn was added with an atomic ratio, Zn/(Zn+In), in the range of from 0.05 to 0.5 (Examples 2-1 to 2-3), jitters after 1000-time overwriting were low, i.e., overwrite characteristics were improved.

The medium of Comparative Example 2-1 in which Zn was not added showed good overwriting characteristics but jitters of 3T playback signals for initial recording marks were not less than 9% after the medium was preserved at 80° C. and 85% RH for 300 hours. That is, the medium has poor preservation reliability.

To the contrary, in the media of Examples 2-4 and 2-5 in which Zn was added with an atomic ratio Zn/(Zn+In) of 0.8 and 1.0, respectively, the overwrite characteristics of the first information layer deteriorated. However, the light transmittance thereof was large relative to those of the media of Comparative Examples 1-1 to 1-3 and in addition jitters after 1000-time overwriting were large but measurable. Therefore it can be said that the heat diffusion layer mainly consisting of In, Zn and O has an effect on the media of Examples 2-4 and 2-5.

Judging from the results mentioned above, the ratio Zn/(In+Zn) is preferably from 0.05 to 0.5.

TABLE 1

| | Heat diffusion layer | Light transmittance (%) Amorphous | Light transmittance (%) Crystal | Jitter after one recording (%) First information layer | Jitter after one recording (%) Second information layer | Jitter after 1000 time overwriting (%) First information layer | Jitter after 1000 time overwriting (%) Second information layer |
|---|---|---|---|---|---|---|---|
| Ex: 1-1 | In—Zn—O | 44 | 50 | 7.5 | 8.3 | 8.9 | 8.7 |
| C. Ex: 1-1 | AlN | 43 | 42 | A number of cracks | 11.2 | Not repeatable | 13.2 |
| C. Ex: 1-2 | SiC | 24 | 28 | 7.5 | 14.9 | 9.4 | Not repeatable |
| C. Ex: 1-3 | $TiO_2$ | 30 | 34 | 7.9 | 13.0 | 10.7 | Not repeatable |

Comparative Example 2-1 and Examples 2-1 to 2-5

The target used for forming the heat diffusion layer in Comparative Example 2-1 and Examples 2-1 to 2-5 mainly contained In, Zn and O, wherein the atomic ratio Zn/(In+Zn) was changed. The atomic ratios of the media are shown in Table 2. The double layer phase change information recording media of Comparative Example 2-1 and Examples 2-1 to In addition, considering the results of other sample experiments, it was confirmed that when the recording layer, the reflective layer and the heat diffusion layer in the first information layer have a thickness of from 3 to 15 nm, from 3 to 20 nm and from 20 to 200 nm, respectively, recording and playback performances in the first information layer and the second information layer were good. It was also confirmed that, in order to perform good recording and play back of information in the second information layer, the light transmittance of the first information layer was required to be not less than 40%.

TABLE 2

|  | Zn/ (In + Zn) | Light transmittance (%) | | Jitters after one recording (%) | | Jitters after 1000-time overwriting (%) | | Jitters of the first information layer (%) after preservation |
|---|---|---|---|---|---|---|---|---|
|  |  | Amorphous | Crystal | First information layer | Second information layer | First information layer | Second information layer |  |
| Comp. Ex: 2-1 | 0 | 45 | 51 | 7.8 | 8.0 | 8.3 | 8.5 | 15.2 |
| Ex: 2-1 | 0.05 | 47 | 52 | 7.8 | 8.0 | 8.3 | 8.6 | 8.9 |
| Ex: 2-2 | 0.3 | 46 | 51 | 7.8 | 8.0 | 8.4 | 8.4 | 8.5 |
| Ex: 2-3 | 0.5 | 46 | 51 | 7.7 | 8.0 | 8.9 | 8.6 | 8.5 |
| Ex: 2-4 | 0.8 | 45 | 52 | 8.0 | 8.2 | 11.4 | 8.7 | 8.6 |
| Ex: 2-5 | 1 | 45 | 51 | 7.8 | 8.2 | 10.8 | 8.4 | 8.5 |

Examples 3-1 and 3-2

A medium of Example 3-1 was manufactured in the same manner as in Example 1-1 except that Ag was used for the first reflective layer, the thickness thereof was 8 nm and a barrier layer consisting of SiC having a thickness of 3 nm was provided between the first upper protective layer and the first reflective layer.

A medium of Example 3-2 was manufactured in the same manner as in Example 3-1 except that no barrier layer was provided.

Recording was performed on each Example under the same conditions as these in Example 1 and then jitters of the first information layer and the second information layer were measured. Jitters of 3T playback signals for initial recording marks were measured after preserving the media at 80° C. and 85% RH for 300 hours. The results are shown in Table 3. It was found that the medium of Example 3-1 in which Ag was used for the first reflective layer and the barrier layer was provided had good jitters after the preservation, meaning that the medium was an excellent optical disc.

(1) The following layers were formed in the following order on the second substrate by a sputtering method in Ar atmosphere to form the second information layer.

The second substrate is a polycarbonate resin disc which has a diameter of 12 cm and a thickness of 1.1 mm. The polycarbonate resin had convexo-concave patterns serving as continuous tracking guides on the surface thereon.

| | |
|---|---|
| Second reflective layer consisting of $Al_{98}Ti_2$ | 120 nm |
| Second upper protective layer consisting of $(ZnS)_{80} \cdot (SiO_2)_{20}$ | 20 nm |
| Second recording layer consisting of $Ge_5Ag_1In_2Sb_{70}Te_{22}$ | 12 nm |
| Second lower protective layer consisting of $(ZnS)_{80} \cdot (SiO_2)_{20}$ | 130 nm |

(2) A resin was spread on the thus formed second information layer to form an intermediate layer which had convexo-concave patterns, (i.e., continuous grooves) serving as a tracking guide on the surface thereon by a 2P (photo polymerization) method. The intermediate layer had a thickness of 30 µm.

TABLE 3

|  | Barrier layer | Light transmittance (%) | | Jitter before preservation (%) | | Jitter after preservation (%) | |
|---|---|---|---|---|---|---|---|
|  |  | Amorphous | Crystal | First information layer | Second information layer | First information layer | Second information layer |
| Ex. 3-1 | Yes | 43 | 47 | 8.0 | 8.4 | 8.8 | 8.7 |
| Ex. 3-2 | No | 46 | 52 | 7.9 | 8.1 | 12.4 | 8.6 |

Examples 4-1 to 4-8

Double layer phase change information recording media of Examples 4-1 to 4-8 were manufactured as follows.

(3) Further, the following layers were formed on the product manufactured above by a sputtering method in Ar atmosphere in the following order to form the first information layer.

| | |
|---|---|
| Heat diffusion layer consisting of the same material as used in Example 2-3 (In—Zn—O) | 40 nm |
| First reflective layer consisting of $Ag_{98}Pd_1Cu_1$ | 12 nm |
| First upper protective layer consisting of $(ZnS)_{80} \cdot (SiO_2)_{20}$ | 15 nm |
| First recording layer consisting of $Ge_4Ag_1In_3Sb_{70}Te_{22}$ | 6 nm |
| First lower protective layer consisting of $(ZnS)_{80} \cdot (SiO_2)_{20}$ | 120 nm |

For the heat diffusion layer, a mixture gas of Ar and $O_2$ was used in the sputtering method. The flow rates of Ar and $O_2$ were 10 sccm and 0.2 sccm, respectively, in order that the resultant heat diffusion layer had a large electric resistivity and light transmittance.

(4) Further, the first substrate, which is formed of a polycarbonate film having a diameter of 12 cm and a thickness of 50 μm was bonded with the surface of the first information layer with a transparent layer therebetween, which transparent layer is a double-sided adhesive sheet having a thickness of 45 μm.

The double layer phase change information recording medium of Example 4-1 was thus made.

In addition, another disc was separately made for measurement for light transmittance. The disc consisted of a substrate having a thickness of 1.1 mm on which a first information layer, a transparent layer and a first substrate were provided in the same manner as mentioned above. The light transmittance of this disc was measured from the side of the first substrate.

(5) A double layer phase change information recording medium of Example 4-2 was made in the same manner as in Example 4-1 except for using a target which was made by sintering $ZnF_2$, ZnO and $In_2O_3$ for the heat diffusion layer.

The atomic ratio Zn/(In+Zn) and the atomic ratio (all halogens)/(In+Zn+all third metal elements) (in this example, the content of all third metal is 0) were measured. The measuring method used was that the composition of the thin film was determined by an XPS (X ray photoelectron spectroscopic analysis). The ratios were calculated using the formulae shown above. The results were shown in Table 4.

A double layer phase change information recording medium of Example 4-3 was made in the same manner as in Example 4-1 except for using sintered ZnO and $In_2O_3$ as the target for the heat diffusion layer and using a mixture of Ar gas, fluorine gas and oxygen gas with a ratio of 10 to 0.2 to 0.2 by volume as the sputtering gas.

A double layer phase change information recording medium of Example 4-4 was made in the same manner as in Example 4-1 except for using sintered ZnO, $In_2O_3$ and $SnO_2$ as the target and using a mixture of Ar gas, fluorine gas and oxygen gas with a ratio of 10 to 0.4 to 0.2 by volume as the sputtering gas.

A double layer phase change information recording medium of Example 4-5 was made in the same manner as in Example 4-2 except for using sintered $ZnF_2$, ZnO and $In_2O_3$ with a different ratio for the heat diffusion layer.

A double layer phase change information recording medium of Example 4-6 was made in the same manner as in Example 4-4 except for using sintered ZnO, $In_2O_3$ and $SnO_2$ with a different ratio for the heat diffusion layer and using a mixture of Ar gas, fluorine gas and oxygen gas with a ratio of 10 to 0.3 to 0.2 by volume as the sputtering gas.

A double layer phase change information recording medium of Example 4-7 was made in the same manner as in Example 4-2 except for using sintered $ZnF_2$, ZnO and $In_2O_3$ with a different ratio for the heat diffusion layer.

The double layer phase change information recording medium of Example 4-8 was made in the same manner as in Example 4-2 except for using sintered ZnO, $In_2O_3$ and Ge as the target for the heat diffusion layer and using a mixture of Ar gas, fluorine gas and oxygen gas with a ratio of 10 to 0.5 to 0.2 by volume as the sputtering gas.

Recording was performed on each medium under the following conditions.

| | |
|---|---|
| Laser wavelength | 405 nm |
| NA = 0.85 | |
| Linear Velocity | 6.5 m/s |
| Track pitch | 0.32 μm |

Jitters of recorded signals formed in the first information layer and the second information layer were measured at a line density of 0.16 μm/bit and jitters after 1,000 time overwriting were also measured. In addition, a minimum recording power (Pw) below which the jitter of the marks formed in the second information layer is not greater than 9% was also determined.

The evaluation results are shown in Table 4. In the media of Examples 4-2 to 4-6, the light transmittance is not less than 52%, the jitters of the marks formed in the first information layer and the second information layer after a first recording is not greater than 9%, meaning these are excellent optical discs. The medium of Example 4-1, has a light transmittance of 47% but the minimum recording power for the second information layer is not less than 11 mW, which is worse than those of the media of Examples 4-2 to 4-6. The cause thereof was considered to be that the light transmittance of the first information layer of the media of Examples 4-2 to 4-6 was improved by fluorine (halogen) contained in the heat diffusion layer consisting of In, Zn and O, resulting in improvement in sensitivity of the second information layer. It is confirmed by the comparison of Examples 4-7 and 4-8 to Example 4-2 that when the inequalities of (All third metal elements)/(In+Zn+all third metal)≦0.2 and 0.01≦(all halogens)/(In+Zn+all third metal elements)≦0.3 are satisfied, the resultant media have excellent performance in recording, and playing back information in the first information layer and the second information layer. It was also confirmed that in order to obtain excellent recording and playback performance in the second information layer, the first information layer was required to have a light transmittance not less than 40%.

It was also confirmed that even when recording and playback is performed with a pickup having an NA of 0.85, light transmittance of the first information layer is required to be not less than 40% for good recording and playback of information in the second information layer.

Therefore, even when an objective lens with a different NA is used for recording and playback, the optical disc of the present invention can record and play back information well by adjusting the thickness of the first information layer within the range of from 10 to 600 μm.

TABLE 4

| | Zn/(In + Zn) | Third metal and its ratio | Ratio of halogen | Light transmittance ratio (%) Amorphous | Light transmittance ratio (%) Crystal | Pw (mW) of the second information layer | Jitters after a first recording (%) First information layer | Jitters after a first recording (%) Second information layer | Jitters after 1000-time overwriting (%) First information layer | Jitters after 1000-time overwriting (%) Second information layer |
|---|---|---|---|---|---|---|---|---|---|---|
| Ex. 4-1 | 0.50 | — | — | 43 | 45 | ≧11.0 | 7.8 | 8.9 | 10.7 | 10.2 |
| Ex. 4-2 | 0.15 | — | 0.09 | 49 | 55 | ≧8.0 | 7.5 | 8.5 | 8.5 | 8.9 |
| Ex. 4-3 | 0.12 | — | 0.04 | 48 | 53 | ≧8.5 | 7.6 | 8.4 | 8.6 | 8.7 |
| Ex. 4-4 | 0.21 | $SnO_2$ 0.04 | 0.07 | 49 | 55 | ≧8.0 | 7.4 | 8.2 | 8.1 | 8.8 |
| Ex. 4-5 | 0.3 | — | 0.25 | 52 | 56 | ≧7.5 | 7.7 | 8.1 | 8.8 | 8.7 |
| Ex. 4-6 | 0.33 | $SnO_2$ 0.2 | 0.05 | 49 | 53 | ≧8.5 | 7.5 | 8.4 | 7.8 | 8.8 |
| Ex. 4-7 | 0.15 | — | 0.32 | 53 | 56 | ≧7.5 | 8.7 | 8.3 | 10.0 | 8.9 |
| Ex. 4-8 | 0.15 | Ge 0.3 | 0.09 | 45 | 48 | ≧10.5 | 8.1 | 8.9 | 9.4 | 10.1 |

Examples 5-1 to 5-8

A double layer phase change information recording medium of Example 5-1 was manufactured in the same manner as in Examples 4-1 except that:

a material $(ZnS)_{70}.(SiO_2)_{30}$ was used for the second upper protective layer and the second lower protective layer;

the target used for forming the first heat diffusion layer was the same as that in Example 4-2;

the thickness of the first heat diffusion layer was changed to 120 nm;

a material $(ZnS)_{70}.(SiO_2)_{30}$ was used for the first upper protective layer and the first lower protective layer;

the thickness of the first upper protective layer and the first lower protective layer was changed to 10 nm; and the thickness of the polycarbonate film of the first substrate was changed to 40 μm.

In addition, another disc for use in measuring the light transmittance was manufactured and the light transmittance thereof was measured in the same manner as in Example 4-1.

Double layer phase change information recording media for Examples 5-2 to 5-8 were made in the same manner as in Example 5-1 except for changing the thickness of the first heat diffusion layer, the first reflective layer and the first recording layer. The film thickness of each layer is shown in Table 5.

For each disc, under the same conditions as in Example 4-1, jitters of first recorded signals in the first information layer and the second information layer and jitters of the recorded signals after 100-time overwriting in the first information layer and the second information layer were measured and the results thereof are shown in Table 5. Each medium has a light transmittance not less than 47%, and jitters after recording once and 100-times are both not greater than 9%, meaning that each medium was an excellent disc.

In addition, in other experiments, when the first information layer, the reflective layer and the heat diffusion layer have a thickness of from 3 to 15 nm, from 3 to 20 nm and from 10 to 200 nm, respectively, performances of recording and playing back information in the first information layer and the second information layer are good. When the thickness of the recording layer and the reflective layer of the first information layer are greater than 15 nm and 20 nm, respectively, the light transmittance thereof does not surpass 40% and therefore the recording performance is poor in the second. information layer.

In addition, when the heat diffusion layer is thicker than 200 nm; it takes 60 seconds to manufacture one double layer optical disc, meaning that such discs are not suitable for mass production.

TABLE 5

| | First heat diffusion layer thickness [nm] | First reflective layer thickness [nm] | First recording layer thickness [nm] | Light transmittance [%] Amorphous | Light transmittance [%] Crystal | Pw for the second Information layer [mw] | Jitter after recording once [%] Information First | Jitter after recording once [%] Information Second | Jitter after 100 time overwriting [%] layer First | Jitter after 100 time overwriting [%] layer second |
|---|---|---|---|---|---|---|---|---|---|---|
| Ex. 5-1 | 10 | 10 | 6 | 47 | 54 | ≧9.0 | 6.9 | 7.0 | 7.2 | 6.9 |
| Ex. 5-2 | 40 | 10 | 5 | 50 | 57 | ≧8.5 | 7.3 | 6.9 | 7.2 | 6.9 |

TABLE 5-continued

|  | First heat diffusion layer thickness [nm] | First reflective layer thickness [nm] | First recording layer thickness [nm] | Light transmittance [%] Amorphous | Light transmittance [%] Crystal | Pw for the second Information layer [mw] | Information layer Jitter after recording once [%] Information First | Information layer Jitter after recording once [%] Information Second | Information layer Jitter after 100 time overwriting [%] layer First | Information layer Jitter after 100 time overwriting [%] layer second |
|---|---|---|---|---|---|---|---|---|---|---|
| Ex. 5-3 | 80 | 5 | 6 | 48 | 55 | ≧9.0 | 7.8 | 7.0 | 8.4 | 7.2 |
| Ex. 5-4 | 100 | 10 | 6 | 47 | 54 | ≧9.0 | 6.8 | 7.2 | 6.8 | 7.4 |
| Ex. 5-5 | 120 | 10 | 8 | 45 | 50 | ≧9.5 | 6.5 | 7.5 | 6.5 | 7.6 |
| Ex. 5-6 | 140 | 10 | 6 | 47 | 53 | ≧9.5 | 6.8 | 7.2 | 6.9 | 7.3 |
| Ex. 5-7 | 35 | 15 | 5 | 45 | 49 | ≧10.0 | 6.5 | 7.5 | 6.6 | 7.8 |
| Ex. 5-8 | 35 | 5 | 10 | 42 | 47 | ≧10.0 | 6.7 | 7.8 | 6.9 | 7.9 |

Example 6

A double layer phase change information recording medium of Example 6 was manufactured in the same manner as in Example 1 except that:

the thickness of the first lower protective layer was changed to 50 nm;

$Ag_{98}Zn_3Al_1$ was used for the first reflective layer;

the thickness of the heat diffusion layer was changed to 100 nm;

$Al_{99}Ti_1$ was used for the second reflective layer;

the thickness thereof was changed to 80 nm;

$Ge_4Ag_1In_3Sb_{67}Te_{25}$ was used for the second recording layer;

the thickness of the second lower protective layer was changed to 80 nm;

the wavelength of laser light used was changed to 660 nm; and the thickness of the intermediate layer was changed to 50 μm.

The light transmittance of the first information layer of this example before and after initialization against light having a wavelength of 660 nm was 56% and 50%, respectively.

Recording was performed for each manufactured disc under the following conditions.

| Laser wavelength | 660 nm |
|---|---|
| NA = 0.65 | |
| Linear Velocity | 3.49 m/s |
| Track pitch | 0.74 μm |

Jitters of the recorded marks formed in the first information layer and the second information layer were measured at a line density of 0.267 μm/bit and also jitters thereof after 1000-time overwriting were measured. The results of recording and playback of information in the first information layer and the second information layer were good.

This document claims priority and contains subject matter related to Japanese Patent Application Nos. 2002-370834 and 2003-142669, filed on Dec. 20, 2002, and May 20, 2003, respectively, both of which are incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A multilayer phase change information recording medium, comprising:

plural information layers including at least a first information layer and a last information layer, each of which comprises:
  a recording layer in which information is recorded utilizing a phase change between a crystalline phase and an amorphous phase,
wherein at least one of the plural information layers other than the last information layer comprises:
  a first lower protective layer;
  a first recording layer located overlying the lower protective layer;
  a first upper protective layer located overlying the first recording layer;
  a first reflective layer located overlying the first upper protective layer; and
  a heat diffusion layer which has a thickness of from 80 to 200 nm, located overlying the first reflective layer, and which mainly comprises In, Zn and O.

2. The multilayer phase change information recording medium according to claim 1, wherein an atomic ratio Zn/(In+Zn) in said heat diffusion layer is from 0.05 to 0.5.

3. The multilayer phase change information recording medium according to claim 1, wherein said heat diffusion layer further comprises at least one halogen.

4. The multilayer phase change information recording medium according to claim 1, wherein said heat diffusion layer further comprises:

at least one metal having a positive three or more valence, wherein the following relationship is satisfied: an atomic ratio M/(In+Zn+M)≦0.2, wherein In and Zn represent atomic ratios of In and Zn in the heat diffusion layer, respectively, and M represents a sum of atomic ratios of the at least one metal element.

5. The multilayer phase change information recording medium according to claim 3, wherein said heat diffusion layer further comprises:

at least one metal having a positive three or more valence; and at least one halogen, wherein the following relationship is satisfied: $0.01 \leq X/(In+Zn+M) \leq 0.3$, wherein In and Zn represent atomic ratios of In and Zn in the heat diffusion layer, respectively, M represents a sum of atomic ratios of the at least one metal element and X represents a sum of atomic ratios of the at least one halogen element.

6. The multilayer phase change information recording medium according to claim 3, wherein the halogen included in said heat diffusion layer is fluorine.

7. The multilayer phase change information recording medium according to claim 1, wherein said heat diffusion layer has a thickness of from 120 to 200 nm.

8. The multilayer phase change information recording medium according to claim 1, wherein the first recording layer comprises Sb and Te, and at least one element selected from the group consisting of Ag, In, Ge, Se, Sn, Al, Ti, V, Mn, Fe, Co, Ni, Cu, Zn, Ga, Bi, Si, Dy, Pd, Pt, Au, S, B, C and P.

9. The multilayer phase change information recording medium according to claim 1, wherein the first recording layer has a thickness of from 3 to 15 nm.

10. The multilayer phase change information recording medium according to claim 1, wherein the first reflective layer comprises at least one element selected from the group of Au, Ag, Cu, W, Al and Ta.

11. The multilayer phase change information recording medium according to claim 1, wherein the first reflective layer has a thickness of from 3 to 20 nm.

12. A double layer phase change information recording medium according to claim 1, further comprising:
    a first substrate;
    a second substrate; and
    an intermediate layer,
        wherein the plural information layers are the first information layer and the last information layer, which are sandwiched by the first substrate and the second substrates,
        wherein the intermediate layer is sandwiched by the first information layer and the last information layer,
        and wherein the last information layer comprises:
            a second lower protective layer;
            a second recording layer located overlying the second lower protective layer;
            a second upper protective layer located overlying the second recording layer; and
            a second reflective layer located overlying the second recording layer.

13. The double layer phase change information recording medium according to claim 12, wherein the first information layer has an optical transmittance of 40 to 70% for light having a wavelength of from 350 to 700 nm.

14. The double layer phase change information recording medium according to claim 12, further comprising a transparent layer located between the first substrate and the first lower protective layer.

15. The double layer phase change information recording medium according to claim 12, further comprising a barrier layer located on at least one of a position between the first upper protective layer and the first reflective layer and a position between the second upper protective layer and the second reflective layer.

16. The double layer phase change information recording medium according to claim 12, wherein the first substrate has a thickness of from 10 to 600 µm.

17. A method of recording information in the multilayer phase change information recording medium according to claim 1, comprising the step of:
    irradiating the plural information layers with a light beam which has a wavelength of from 350 to 700 nm from a side of the first information layer to record information in the plural information layers.

18. A method of recording information and playing back information in the multilayer phase change information recording medium according to claim 1, comprising the steps of:
    (A) irradiating the plural information layers with a light beam which has a wavelength of from 350 to 700 nm from a side of the first information layer to record information in the plural information layers; and
    (B) irradiating the plural information layers with a light beam which has a wavelength of from 350 to 700 nm from a side of the first information layer to play back the information recorded in the plural information layers.

19. The method according to claim 17 wherein an atomic ratio Zn/(In+Zn) in said heat diffusion layer is from 0.05 to 0.5.

* * * * *